US012631575B2

(12) United States Patent
Lin et al.

(10) Patent No.: US 12,631,575 B2
(45) Date of Patent: May 19, 2026

(54) BATTERY DEFECT INSPECTION DEVICE, METHOD, AND APPARATUS

(71) Applicant: CONTEMPORARY AMPEREX TECHNOLOGY CO., LIMITED, Ningde (CN)

(72) Inventors: Hao Lin, Ningde (CN); Jianlin Liu, Ningde (CN); Fenglin Zhang, Ningde (CN); Xiaofeng Zhou, Ningde (CN)

(73) Assignee: CONTEMPORARY AMPEREX TECHNOLOGY CO., LIMITED, Ningde City (CN)

( * ) Notice: Subject to any disclaimer, the term of this patent is extended or adjusted under 35 U.S.C. 154(b) by 0 days.

(21) Appl. No.: 19/295,848

(22) Filed: Aug. 11, 2025

(65) Prior Publication Data

US 2025/0362252 A1     Nov. 27, 2025

Related U.S. Application Data

(63) Continuation of application No. PCT/CN2023/137015, filed on Dec. 7, 2023.

(30) Foreign Application Priority Data

Jun. 30, 2023     (CN) .......................... 202310797731.2

(51) Int. Cl.
| | |
|---|---|
| *G01N 23/18* | (2018.01) |
| *G01N 23/04* | (2018.01) |
| *G01N 23/083* | (2018.01) |

(52) U.S. Cl.
CPC ............. *G01N 23/18* (2013.01); *G01N 23/04* (2013.01); *G01N 23/083* (2013.01); *G01N 2223/3303* (2013.01); *G01N 2223/611* (2013.01)

(58) Field of Classification Search
CPC ........ G01R 31/36; G01N 21/95; G01N 21/01; G01N 21/8851; G01N 23/046;
(Continued)

(56) References Cited

U.S. PATENT DOCUMENTS

| | | | | |
|---|---|---|---|---|
| 2020/0363344 | A1* | 11/2020 | Heo ........................ | G01N 23/18 |
| 2023/0243640 | A1* | 8/2023 | Sakurai ................ | G06V 10/757 382/141 |
| 2023/0251212 | A1* | 8/2023 | Wagner .................. | G01N 23/18 382/141 |
| 2023/0258582 | A1* | 8/2023 | Sakai ................... | G01N 23/046 378/20 |

(Continued)

FOREIGN PATENT DOCUMENTS

| | | |
|---|---|---|
| CN | 110632088 A | 12/2019 |
| CN | 111871867 A | 11/2020 |

(Continued)

OTHER PUBLICATIONS

ISR for PCT/CN2023/137015 mailed Feb. 21, 2024.
(Continued)

*Primary Examiner* — Irakli Kiknadze
(74) *Attorney, Agent, or Firm* — Ladas & Parry, LLP

(57) ABSTRACT

A battery defect inspection device, method, and apparatus are disclosed. The battery defect inspection device includes a ray source, a detector, and a supporting component between the ray source and the detector. A battery under inspection is configured to be located on a supporting surface of the supporting component. The battery defect inspection device further includes a rotation mechanism. The rotation mechanism is configured to rotate the supporting component along a preset rotation axis, or is configured to rotate the ray source and the detector about a preset rotation axis, such that the optical axis of the rays emitted from the ray source is projected obliquely onto a surface of the battery under inspection. At least an included angle between an end surface of the battery under inspection and a plane on which the detector is located can be flexibly (Continued)

adjusted according to the needs of different inspection scenarios.

20 Claims, 8 Drawing Sheets

(58) Field of Classification Search

CPC ........ G01N 23/04; G01N 21/88; G01N 23/02; G01N 23/18; G01N 23/083; G01N 2021/8887; G01N 2223/643; G01N 2223/645; G01N 23/043; G01N 2223/1016; G01N 2223/646; G01N 2223/03; G01N 2223/401; G01N 23/10; G01N 2223/611; G01N 2223/3303; G01N 2223/33; G01N 2223/307; G01N 2223/302; G01N 2223/304; G01N 2223/32; G01N 2223/204; G01N 2223/60; H01M 10/058; H01M 10/4285; H01M 10/04; H01M 10/0413; H01M 10/0585; H01M 10/48; H01M 10/121; B65G 37/00; B65G 57/11; B65G 59/02; B65G 2814/0305; B65G 2207/14; B65G 2814/031; B65G 2201/02; B07C 5/346; Y02E 60/10; G06T 7/0002; G06T 2207/10081; G06T 2207/20081; G06T 2207/20084; G06T 7/62; G06T 7/0004; G06T 11/005; G06T 7/001; G06T 7/13; G06T 2207/10116; G06T 2207/30108; Y02P 70/50

USPC ............................................ 378/4, 19, 57, 58

See application file for complete search history.

(56) References Cited

U.S. PATENT DOCUMENTS

| | | | | |
|---|---|---|---|---|
| 2024/0054617 | A1* | 2/2024 | Tsuchiya ............... | A61B 6/4291 |
| 2024/0133682 | A1* | 4/2024 | Zhang .................... | G01B 21/16 |
| 2024/0255443 | A1* | 8/2024 | Matsubara ........... | G01N 23/083 |
| 2024/0255444 | A1* | 8/2024 | Matsubara ........... | A61B 6/4429 |
| 2024/0265519 | A1* | 8/2024 | Shin ...................... | G06T 7/0006 |
| 2024/0265577 | A1* | 8/2024 | Shin ......................... | G06T 7/80 |

FOREIGN PATENT DOCUMENTS

| | | | |
|---|---|---|---|
| CN | 111948233 | A | 11/2020 |
| CN | 113378743 | A | 9/2021 |
| CN | 113618356 | A | 11/2021 |
| CN | 113924675 | A | 1/2022 |
| CN | 114609164 | A | 6/2022 |
| CN | 115508389 | A | 12/2022 |
| CN | 115825127 | A | 3/2023 |
| CN | 115839965 | A | 3/2023 |
| CN | 115950905 | A | 4/2023 |
| CN | 218848012 | U | 4/2023 |
| CN | 116203051 | A | 6/2023 |
| GB | 2443432 | A | 5/2008 |
| KR | 20220086871 | A | 6/2022 |

OTHER PUBLICATIONS

Written Opinion or PCT/CN2023/137015 mailed Feb. 21, 2024.
Office action from corresponding Chinese Patent Application No. 202310797731.2 dated Aug. 14, 2025, with search report.
Extended Search Report from corresponding European Patent Application No. 23943389.9 dated Apr. 9, 2026.

* cited by examiner 4111 4112

BATTERY DEFECT INSPECTION DEVICE, METHOD, AND APPARATUS

CROSS-REFERENCE TO RELATED APPLICATIONS

This application is a continuation of International application PCT/CN2023/137015 filed on Dec. 7, 2023 that claims priority to Chinese Patent Application No. 202310797731.2, filed on Jun. 30, 2023. The content of these applications is incorporated by reference herein in its entirety.

TECHNICAL FIELD

This application relates to the field of battery technologies, and more particularly, to a battery defect inspection device, method, and apparatus.

BACKGROUND

Energy conservation and emission reduction are key to the sustainable development of the automotive industry, and electric vehicles, due to their energy-saving and environmentally friendly advantages, have become a critical component of this sustainable development of the automotive industry. For electric vehicles, battery technology is an important factor in their development.

During the battery production process, various internal defects may occur, which can affect the quality and safety of the battery. While improving battery production efficiency, manufacturers have also conducted more comprehensive inspections of potential defects in the battery manufacturing process to ensure the safety of products entering the market. In related technologies, when inspecting internal defects of batteries, the internal battery imaging is often unclear, leading to an inability to identify internal battery defects and thereby affecting the reliability of the battery.

SUMMARY

This application aims to at least resolve one of the technical problems identified in the background. To this end, an object of this application is to provide a battery defect inspection device, method, and apparatus to alleviate/mitigate/resolve the issue in internal battery imaging clarity during inspection.

A first aspect of this application provides a battery defect inspection device, including a ray source, a detector, and a supporting component located between the ray source and the detector, where the supporting component is configured to support a battery under inspection, the supporting component includes a supporting surface, and the battery under inspection is configured to be located on the supporting surface.

The battery defect inspection device further includes a rotation mechanism, where the rotation mechanism is configured to rotate the supporting component along a preset rotation axis, or the rotation mechanism is configured to rotate the ray source and the detector along a preset rotation axis, such that an optical axis of rays emitted by the ray source is projected obliquely onto a surface of the battery under inspection, and the detector is configured to receive rays penetrating the battery under inspection to obtain an initial image, where the initial image is used for defect inspection of the battery under inspection.

In the technical solutions of the embodiments of this application, the battery can be inspected through the ray source, the detector, and the supporting component. The rotation mechanism may be provided to flexibly adjust the relative angle between the battery under inspection and the rays emitted by the ray source according to the needs of different inspection scenarios, which can to some extent reduce occlusion between internal structures of the battery and to some extent enable all of the individual internal structures of the battery to be clearly captured during imaging. In some examples, to some extent, this enables at least the cathode tab and the anode tab to be clearly captured together during imaging.

The rotation mechanism is configured to rotate the supporting component along a preset rotation axis, or the rotation mechanism is configured to rotate the ray source and the detector along a preset rotation axis. Based on the above two adjustment methods, at least the angle between an end surface of the battery under inspection and a plane on which the detector is located can be adjusted. This can to some extent alleviate the issue of unclear imaging of some internal structures of the battery due to a fixed imaging angle, enhancing the quality of the inspection image and to some extent improving the accuracy of image recognition.

In some embodiments, the battery defect inspection device further includes a defect inspection unit connected to the detector, where the defect inspection unit is configured to perform defect inspection on the battery under inspection based on an electrical signal or the initial image from the detector. With the defect inspection unit provided to receive the electrical signal or the indirectly generated initial image from the detector and output an inspection result of the battery under inspection, automatic inspection of internal defects of the battery under inspection can be achieved, improving the automation level and inspection efficiency of the battery inspection device.

In some embodiments, the battery under inspection includes an end surface, where the end surface is a plane on which a battery end cover is located. In a direction perpendicular to the supporting surface, a projection of a middle region of the end surface of the battery under inspection on the supporting surface is located within a middle region of the supporting surface. The rays emitted by the ray source are configured to be projected at least obliquely onto the middle region of the end surface of the battery under inspection. Since the projection of the central region of the end surface of the battery under inspection on the supporting surface is located within the central region of the supporting surface, when the rays emitted by the ray source are projected onto the battery under inspection, the rays can travel from the middle region of the battery under inspection toward an edge region of the battery under inspection, to some extent reducing occlusion of tab imaging by a cell top cover adapter, allowing clearer imaging of tab morphology and to some extent improving the accuracy of image recognition.

In some embodiments, the preset rotation axis is perpendicular to the supporting surface. When the supporting component is rotated along the preset rotation axis, or when the ray source and the detector are rotated along the preset rotation axis, rotation occurs within the supporting surface, which can to some extent reduce occlusion of the rays by the supporting surface and increase the stability of rotation.

In some embodiments, the preset rotation axis at least passes through a middle region of the supporting surface, which, during rotation, can to some extent control the optical axis of the rays emitted by the ray source to always be projected obliquely onto the middle region of the supporting surface, that is, onto a central region of the surface of the battery under inspection, improving inspection consistency and stability.

In some embodiments, includes an end surface, an included angle α between an end surface of the battery under inspection and a plane on which the detector is located satisfies: 0°≤α≤45°. A reasonable rotation angle adjustment allows clearer imaging of individual internal structures of the battery and improves, to some extent, the inspection accuracy of the morphology of the two tabs inside the battery.

In some embodiments, the battery defect inspection device further includes a first adjustment mechanism, where the first adjustment mechanism is connected to the supporting component and is configured to drive the supporting component to move to adjust a distance between the supporting component and the ray source. According to the principle of similar triangles, the magnification of the battery defect inspection device is related to the distance between the supporting component and the ray source. If the magnification is too small, the magnification effect cannot be effectively achieved; if the magnification is too large, it may lead to unclear inspection images, affecting the inspection performance.

Therefore, adjusting the distance between the supporting component and the ray source can control the magnification of the inspection device, enabling the initial image to achieve a magnification effect while also to some extent adjusting the imaging quality.

The size of a radiation surface irradiated on the surface of the battery under inspection can also be controlled. When the distance between the ray source and the supporting component is small, the radiation surface of the rays on the surface of the battery under inspection is also relatively small, and only a partial region of the battery is irradiated by the rays, which thus can enhance the inspection accuracy of local details to some extent. When the distance between the ray source and the supporting component increases, the radiation surface of the rays on the surface of the battery under inspection also increases accordingly, thereby covering a larger inspection surface and to some extent reducing the possibility of missed inspection.

In some embodiments, the battery defect inspection device further includes a second adjustment mechanism, where the second adjustment mechanism is connected to the ray source and is configured to drive the ray source to move to adjust a distance between the ray source and the detector, or the second adjustment mechanism is connected to the detector and is configured to drive the detector to move to adjust a distance between the ray source and the detector.

Adjusting the distance between the ray source and the detector allows adaptation to the inspection of different types of batteries. Moreover, the magnification of the battery defect inspection device is also related to the distance between the ray source and the detector. If the magnification is too small, the magnification effect cannot be effectively achieved; if the magnification is too large, it may lead to unclear initial images, affecting the inspection performance. Therefore, adjusting the distance between the ray source and the detector can control the magnification of the battery defect inspection device, enabling the initial image to achieve a magnification effect while also to some extent adjusting the imaging quality.

In some embodiments, a rated voltage V of the ray source satisfies: 130 kV≤V≤150 kV, and/or a rated current I of the ray source satisfies: I≤500 μA. The range of voltage and/or current values is set such that the rays emitted by the ray source can penetrate the tabs of the battery for inspection, while avoiding overexposure that may affect the accuracy of inspection.

A second aspect of this application provides a battery defect inspection method using the battery defect inspection device according to any one of the above embodiments, including: in response to the battery under inspection being placed on the supporting component, rotating the supporting component along a preset rotation axis, or rotating the ray source and the detector along a preset rotation axis, such that an optical axis of rays emitted by the ray source is projected obliquely onto a surface of the battery under inspection; and acquiring an initial image obtained by the detector by receiving rays penetrating the battery under inspection, where the initial image is used for defect inspection of the battery under inspection.

The relative angle between the battery under inspection and the rays emitted by the ray source can be flexibly adjusted according to the needs of different inspection scenarios, which can to some extent reduce occlusion between internal structures of the battery and to some extent enable all of the individual internal structures of the battery to be clearly captured during imaging. This can to some extent alleviate the issue of unclear imaging of some internal structures of the battery due to a fixed imaging angle, enhancing the quality of the inspection image and to some extent improving the accuracy of image recognition.

In some embodiments, the optical axis of the rays emitted by the ray source is adjusted and projected obliquely onto the surface of the battery under inspection to at least form an included angle between the end surface of the battery under inspection and a plane on which the detector is located, where the included angle is configured to satisfy that a projection of a cathode tab of the battery under inspection, formed on a plane on which an anode tab is located based on rays projected onto the cathode tab, is offset from a region in which the anode tab is located, or an overlapping area between the two is less than a preset value.

Adjusting the included angle between the end surface of the battery under inspection and the plane on which the detector is located can at least partially offset the cathode tab and the anode tab in the imaging direction, thereby reducing occlusion of one by the other, to some extent improving the imaging clarity of the two and further improving image recognition accuracy to enhance the sampling efficiency of inspection images.

In some embodiments, the surface of the battery under inspection includes a side surface, and the preset rotation axis is perpendicular to the side surface of the battery under inspection. The side surface of the battery under inspection refers to the large surface of the battery under inspection, and the preset rotation axis is perpendicular to the large surface of the battery under inspection. During rotation, the large surface of the battery always remains in the same plane, improving imaging consistency and stability after rotation and thereby enhancing the inspection performance.

In some embodiments, the optical axis of the rays emitted by the ray source is projected obliquely onto a middle region of the end surface of the battery under inspection. Since the projection of the central region of the end surface of the battery under inspection on the supporting surface is located within the central region of the supporting surface, that is, the central region of the large surface of the battery under inspection is located within the central region of the supporting surface, when the rays emitted by the ray source are projected onto the middle region of the end surface of the battery under inspection, the rays can travel from the middle region of the battery end surface toward an edge region of the battery, to some extent reducing occlusion of tab imaging by a cell top cover adapter, allowing clearer imaging of tab morphology and to some extent improving the accuracy of image recognition.

In some embodiments, a distance between the ray source and the detector and/or a distance between the supporting component and the ray source is adjusted in a direction perpendicular to the plane on which the detector is located.

According to the principle of similar triangles, the magnification of the battery defect inspection device is related to the distance between the ray source and the detector and/or the distance between the supporting component and the ray source. If the magnification is too small, the magnification effect cannot be effectively achieved; if the magnification is too large, it may lead to unclear initial images, affecting the inspection performance. Therefore, adjusting the distance between the ray source and the detector and/or the distance between the supporting component and the ray source can control the magnification of the inspection device, enabling the initial image to achieve a magnification effect while also to some extent adjusting the imaging quality.

The size of a radiation surface irradiated on the surface of the battery under inspection can also be controlled. When the distance between the ray source and the supporting component is small, the radiation surface of the rays on the surface of the battery under inspection is also relatively small, and only a partial region of the battery is irradiated by the rays, which can enhance the inspection accuracy of local details to some extent. When the distance between the ray source and the supporting component increases, the radiation surface of the rays on the surface of the battery under inspection also increases accordingly, thereby covering a larger inspection surface and to some extent reducing the possibility of missed inspection.

In some embodiments, in response to an inspection result of the battery under inspection being unqualified, the battery under inspection is rejected or subjected to re-inspection.

A third aspect of this application provides a battery defect inspection apparatus, the apparatus including an adjustment module and an acquisition module, where the adjustment module is configured to, in response to a battery under inspection being placed on a supporting component, adjust the supporting component along a preset rotation axis, or adjust the ray source and the detector along a preset rotation axis, such that an optical axis of rays emitted by the ray source is projected obliquely onto a surface of the battery under inspection; and the acquisition module is configured to acquire an initial image obtained by the detector by receiving rays penetrating the battery under inspection, where the initial image is used for defect inspection of the battery under inspection.

The relative angle between the battery under inspection and the rays emitted by the ray source can be flexibly adjusted according to the needs of different inspection scenarios, which can to some extent reduce occlusion between individual internal structures of the battery and to some extent enable all of the individual internal structures of the battery to be clearly captured during imaging. This can to some extent alleviate the issue of unclear imaging of some internal structures of the battery due to a fixed imaging angle, enhancing the quality of the inspection image and to some extent improving the accuracy of image recognition.

In some embodiments, the battery defect inspection apparatus further includes an inspection module, where the inspection module is configured to perform defect inspection on the battery under inspection based on the initial image. Inspection of internal defects of the battery under inspection can be achieved by configuring the inspection module to receive the initial image generated by the detector and analyze the initial image to output an inspection result of the battery under inspection, improving the automation level and inspection efficiency of the battery defect inspection apparatus.

A fourth aspect of this application provides an electronic device, including at least one processor; and a memory communicatively connected to the at least one processor; where the memory stores instructions executable by the at least one processor, and the instructions are executed by the at least one processor to enable the at least one processor to perform the battery defect inspection method according to any one of the above embodiments.

A fifth aspect of this application provides a battery defect inspection device, including the electronic device in the above embodiments.

A sixth aspect of this application provides a computer-readable storage medium storing a computer program, where the computer program, when executed by a processor, implements the battery defect inspection method according to any one of the above embodiments.

The above description is only an overview of the technical solutions of this application. To enable a clearer understanding of the technical means of this application and to implement them in accordance with the contents of the specification, and to make the above and other objects, features, and advantages of this application more apparent and understandable, specific embodiments of this application are provided below.

BRIEF DESCRIPTION OF DRAWINGS

In the drawings, unless otherwise specified, the same reference numerals throughout multiple drawings denote the same or similar components or elements. These accompanying drawings may not necessarily be drawn to scale. It should be understood that these accompanying drawings illustrate only some embodiments disclosed in this application and should not be construed as limitations on the scope of this application. To describe the technical solutions in the embodiments of this application more clearly, the following briefly describes the accompanying drawings required for describing the embodiments of this application. Apparently, the accompanying drawings in the following descriptions show merely some embodiments of this application, and persons of ordinary skill in the art may still derive other drawings from the accompanying drawings without creative efforts.

DETAILED DESCRIPTION

Figure 1:
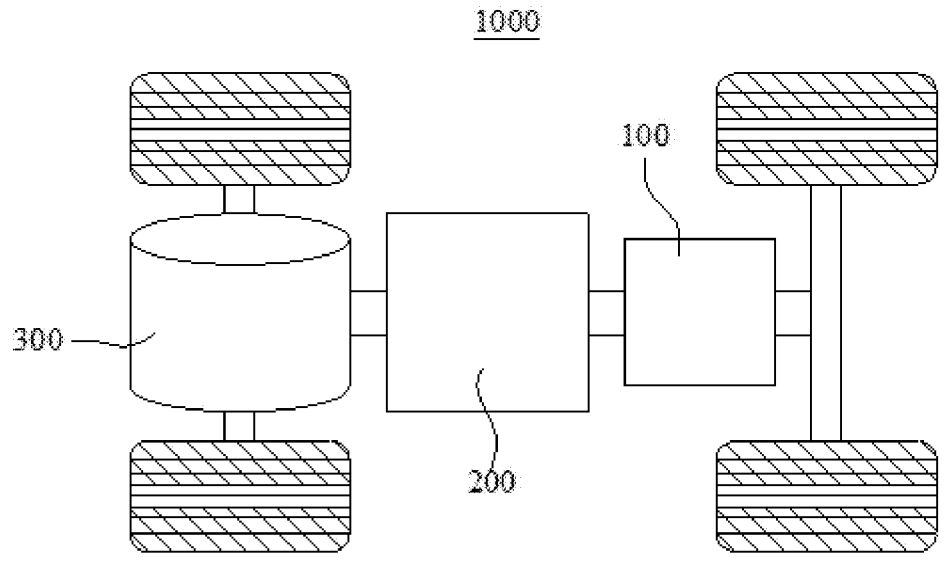
FIG. 1 is a schematic structural diagram of a vehicle according to some embodiments of this application.

The embodiments of the technical solutions of this application will be described in detail below with reference to the accompanying drawings. The following embodiments are merely intended for a clearer description of the technical solutions of this application and therefore are used as examples, which do not constitute any limitations on the protection scope of this application.

Unless otherwise defined, all technical and scientific terms used herein have the same meanings as commonly understood by those skilled in the technical field of this application; the terms used herein are only for the purpose of describing specific embodiments and are not intended to limit this application; the terms "include" and "have" and any variations thereof in the specification, claims, and descriptions of the above drawings of this application are intended to cover non-exclusive inclusion.

In the description of the embodiments of this application, technical terms such as "first" and "second" are used only to distinguish different objects and should not be understood as indicating or implying relative importance or implicitly indicating the number, specific order, or primary-secondary relationship of the indicated technical features. In the description of the embodiments of this application, "plurality" means two or more, unless otherwise explicitly and specifically defined.

In this specification, reference to "embodiment" means that specific features, structures, or characteristics described with reference to the embodiment may be incorporated in at least one embodiment of this application. The appearance of this phrase in various places in the specification does not necessarily refer to the same embodiment, nor is it an independent or alternative embodiment mutually exclusive with other embodiments. Persons skilled in the art explicitly and implicitly understand that the embodiments described herein may be combined with other embodiments.

In the description of the embodiments of this application, the term "and/or" is only an associative relationship for describing associated objects, indicating that three relationships may be present. For example, A and/or B may indicate the following three cases: presence of only A, presence of both A and B, and presence of only B. In addition, the character "/" herein generally indicates an "or" relationship between the associated objects.

In the description of the embodiments of this application, the term "multiple" refers to two or more (including two); similarly, "multiple groups" refers to two or more groups (including two groups), and "multiple pieces" refers to two or more pieces (including two pieces).

In the description of the embodiments of this application, technical terms such as "center," "longitudinal," "lateral," "length," "width," "thickness," "upper," "lower," "front," "rear," "left," "right," "vertical," "horizontal," "top," "bot-tom," "inner," "outer," "clockwise," "counterclockwise," "axial," "radial," and "circumferential" indicate orientations or positional relationships based on the orientations or positional relationships shown in the drawings. They are used only for the convenience of describing the embodiments of this application and simplifying the description, and do not indicate or imply that the referred device or element must have a specific orientation, be constructed, and operated in a specific orientation, and therefore should not be construed as limitations on the embodiments of this application.

In the description of the embodiments of this application, unless otherwise explicitly specified and defined, technical terms such as "install," "connect," "connection," and "fix" should be understood in a broad sense. For example, it may be a fixed connection, a detachable connection, or an integral connection; it may be a mechanical connection or an electrical connection; it may be a direct connection or an indirect connection through an intermediate medium; it may be internal communication between two elements or an interaction relationship between two elements. For those of ordinary skill in the art, the specific meanings of the above terms in the embodiments of this application can be understood according to specific circumstances.

Currently, from the perspective of market development, the application of power batteries is becoming increasingly widespread. Power batteries are not only used in energy storage power systems such as hydropower, thermal power, wind power, and solar power plants but are also widely applied in electric vehicles such as electric bicycles, electric motorcycles, and electric cars, as well as in military equipment, aerospace, and other fields. With the continuous expansion of the application fields of power batteries, the market demand for them is also continuously increasing.

The applicant has noticed that during the production and use of batteries, defects may occur in the batteries. For example, during the battery production process, defects such as tab folding or tab breakage may occur, and batteries with defects need to be removed to avoid affecting the reliability of the battery to some extent. The spacing between the cathode and anode electrode plates and the misalignment amount of the cathode and anode electrode plates inside the battery are also important factors affecting the safety performance of the battery. Regarding the spacing between the cathode and anode electrode plates: during the charging and discharging process of a lithium battery, when the spacing between the cathode and anode electrode plates is large, lithium ions cannot fully embed into the anode channels, leading to the accumulation of some lithium ions and causing lithium precipitation, which poses significant safety risks. Therefore, the spacing between the cathode and anode electrode plates inside the battery should not be too large. Regarding the misalignment amount of the cathode and anode electrode plates: during the charging and discharging process of a lithium battery, lithium ions repeatedly intercalate and deintercalate between the cathode and anode electrode plates. However, when lithium ions deintercalate from the cathode but there are insufficient anode channels for embedding, it is easy to cause lithium ion accumulation and lithium precipitation, posing certain product safety risks. Therefore, it is necessary to ensure that the cathode electrode plate is entirely within the coverage range of the anode, that is, to ensure that the anode exceeds the cathode, meaning the misalignment amount of the cathode and anode electrode plates must be greater than 0. Therefore, it is necessary to inspect the internal spacing and the misalignment amount of the cathode and anode electrode plates to timely discover internal defects of the battery and reduce the outflow of defective batteries. However, these defects cannot be observed from the exterior of the battery, and internal inspection of the battery is required to determine whether the above defects exist by inspecting the tab morphology.

Based on the above considerations, to address the issue of insufficient accuracy in internal defect inspection of batteries, a ray projection detection method can be adopted to achieve non-destructive inspection of the battery interior. With the battery under inspection being placed between a ray source and a detector, the rays emitted by the ray source penetrate the battery and are received by the detector, thereby obtaining positional and status information of the cathode and anode electrode plates inside the battery, and enabling the inspection of various internal defects of the battery.

The flat panel detector, battery inspection device, and battery production equipment disclosed in the embodiments of this application can be used in the battery production and manufacturing process. The inspected or produced battery cells can be, but are not limited to, used in electric apparatuses such as vehicles, ships, or aircraft. The battery cell, battery, and the like disclosed in this application may be used to constitute a power supply system of that electric apparatus.

The embodiments of this application provide an electric apparatus using a battery as a power source, where the electric apparatus may include, but is not limited to, a mobile phone, a tablet, a laptop, an electric toy, an electric tool, an electric bicycle, an electric vehicle, a ship, a spacecraft, and the like. The electric toy may be a fixed or mobile electric toy, for example, a game console, an electric toy car, an electric toy ship, and an electric toy airplane. The spacecraft may include an airplane, a rocket, a space shuttle, a spaceship, and the like.

For the convenience of explanation, the following embodiments take an electric apparatus as a vehicle 1000 as an example for description.

Refer to FIG. 1. FIG. 1 is a schematic structural diagram of a vehicle 1000 according to some embodiments of this application. The vehicle 1000 may be a fossil fuel vehicle, a natural-gas vehicle, or a new energy vehicle, where the new energy vehicle may be a battery electric vehicle, a hybrid electric vehicle, a range-extended vehicle, or the like. A battery 100 is provided inside the vehicle 1000, and the battery 100 may be disposed at the bottom, front, or rear of the vehicle 1000. The battery 100 may be configured to supply power to the vehicle 1000. For example, the battery 100 may be used as an operational power supply for the vehicle 1000. The vehicle 1000 may further include a controller 200 and a motor 300, where the controller 200 is used to control the battery 100 to supply power to the motor 300, for example, for the operational power requirements during starting, navigation, and driving of the vehicle 1000.

In some embodiments of this application, the battery 100 can be used not only as the operational power supply for the vehicle 1000 but also as a driving power source for the vehicle 1000, replacing or partially replacing fossil fuel or natural gas to provide driving traction for the vehicle 1000.

Figure 2:
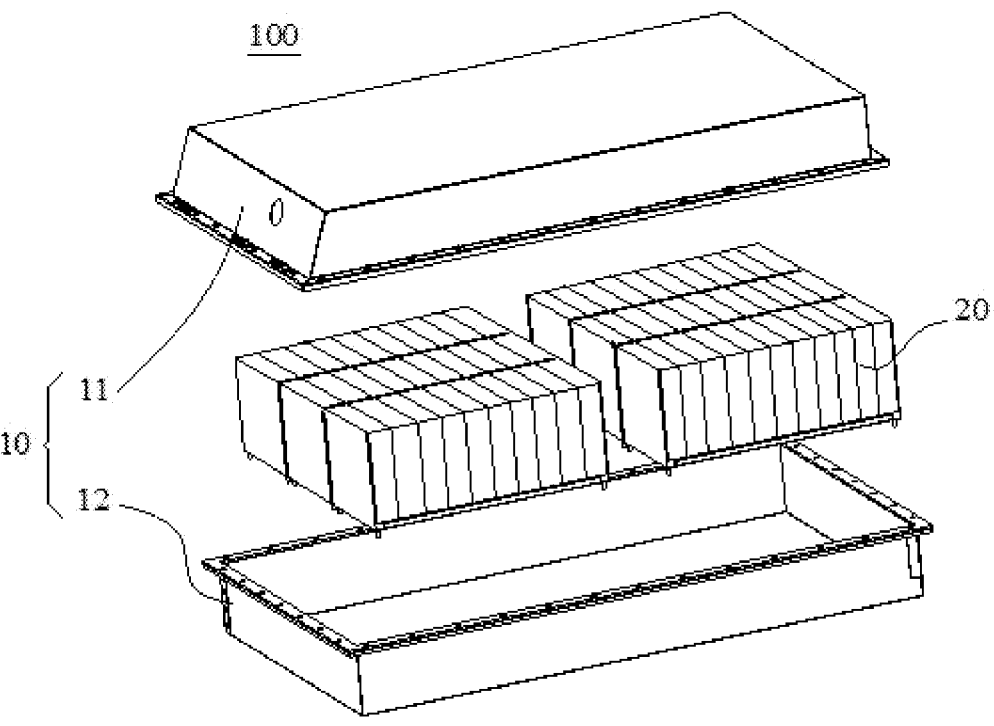
FIG. 2 is a schematic structural exploded view of a battery according to some embodiments of this application.

Referring to FIG. 2, FIG. 2 is a schematic structural exploded view of a battery 100 according to some embodiments of this application. The battery 100 includes an enclosure 10 and battery cells 20, where the battery cells 20 are accommodated in the enclosure 10. The enclosure 10 is configured to provide an accommodating space for the battery cells 20. The enclosure 10 may be of various structures. In some embodiments, the enclosure 10 may include a first part 11 and a second part 12, where the first part 11 and the second part 12 cover each other, and the first part 11 and the second part 12 together define an accommodating space for accommodating the battery cells 20. The second part 12 may be a hollow structure with an opening at one end, and the first part 11 may be a plate-like structure, where the first part 11 covers the opening side of the second part 12, such that the first part 11 and the second part 12 together define the accommodating space; the first part 11 and the second part 12 may also both be hollow structures with an opening on one side, where the opening side of the first part 11 covers the opening side of the second part 12. Of course, the enclosure 10 formed by the first part 11 and the second part 12 may be of various shapes, such as a cylinder, a cuboid, or the like.

In the battery 100, there may be a plurality of battery cells 20, and the plurality of battery cells 20 may be connected in series, parallel, or series-parallel, where series-parallel means a combination of series and parallel connections of the plurality of battery cells 20. The plurality of battery cells 20 may be directly connected in series, parallel, or series-parallel, and then an entirety of the plurality of battery cells 20 is accommodated in the enclosure 10. Certainly, the battery 100 may alternatively be formed in a manner that a plurality of battery cells 20 are first connected in series, parallel, or series-parallel to form a battery module, and then a plurality of battery modules are connected in series, parallel, or series-parallel to form an entirety, which is accommodated in the enclosure 10. The battery 100 may further include other structures. For example, the battery 100 may further include a busbar configured to implement electrical connection between the plurality of battery cells 20.

Each battery cell 20 may be a secondary battery or a primary battery; it may also be a lithium-sulfur battery, a sodium-ion battery, or a magnesium-ion battery, but is not limited thereto. The battery cell 20 may be cylindrical, flat, cuboid, or of other shapes.

Figure 3:
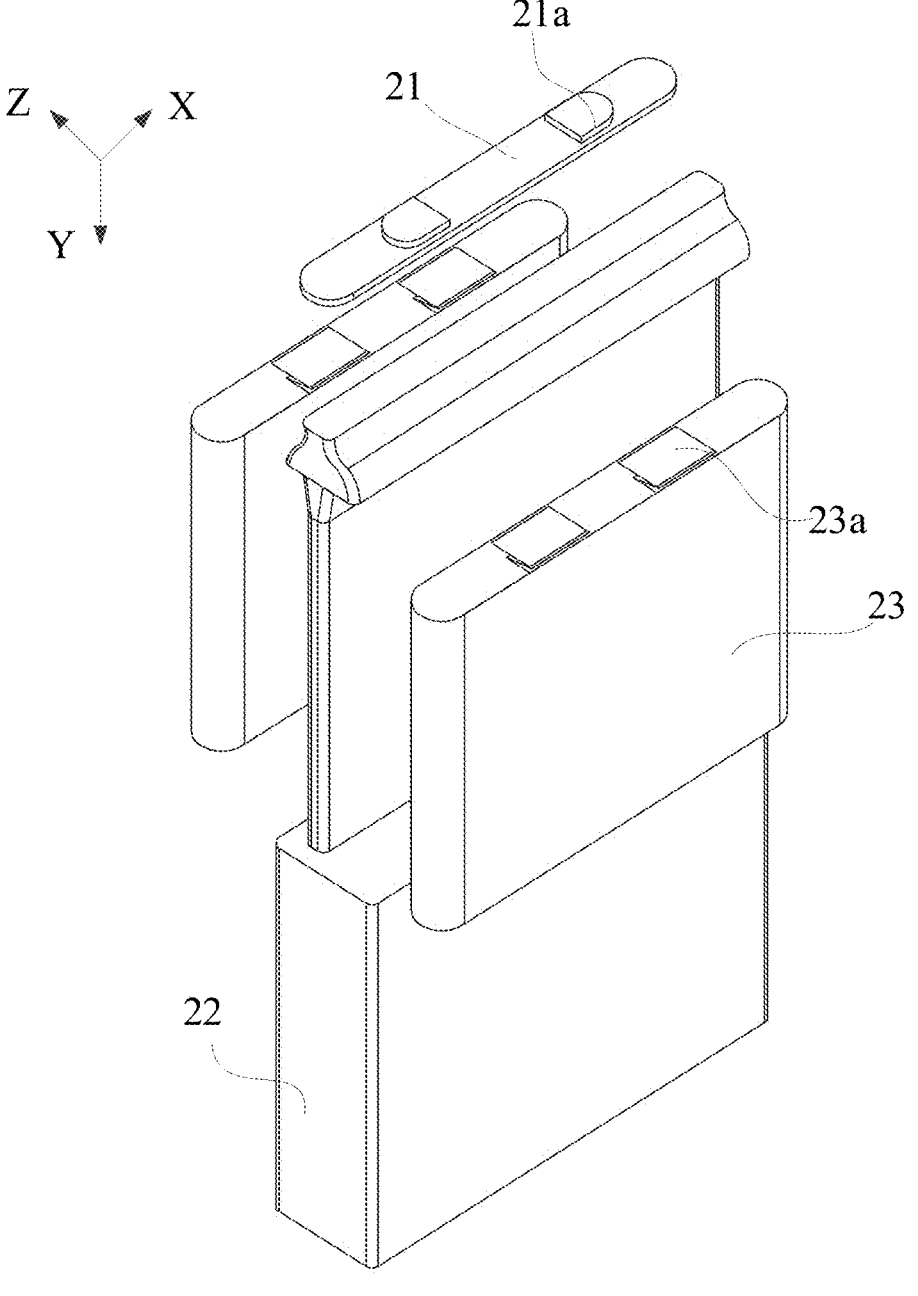
FIG. 3 is a schematic structural exploded view of a battery cell according to some embodiments of this application.

Referring to FIG. 3, FIG. 3 is a schematic structural exploded view of a battery cell 20 according to some embodiments of this application. The battery cell 20 refers to the smallest unit constituting a battery. As shown in FIG. 3, the battery cell 20 includes an end cover 21, a housing 22, a cell assembly 23, and other functional components.

The end cover 21 refers to a component that covers an opening of the housing 22 to isolate an internal environment of the battery cell 20 from an external environment. Without limitation, the shape of the end cover 21 may be adapted to the shape of the housing 22 to fit the housing 22. In some embodiments, the end cover 21 may be made of a material with given hardness and strength (for example, aluminum alloy), so that the end cover 21 is less likely to deform when subjected to extrusion and collision, allowing the battery cell 20 to have higher structural strength and enhanced safety performance. The end cover 21 may be provided with functional components such as an electrode terminal 21a. The electrode terminal 21a may be configured to electrically connect to the cell assembly 23 for outputting or inputting electric energy of the battery cell 20. In some embodiments, the end cover 21 may further be provided with a pressure relief mechanism for releasing internal pressure when the internal pressure or temperature of the battery cell 20 reaches a threshold. The material of the end cover 21 may also be varied, such as copper, iron, aluminum, stainless steel, aluminum alloy, and plastic, which is not particularly limited in the embodiments of this application. In some embodiments, an insulating member may further be provided on the inner side of the end cover 21, where the insulating member may be used to isolate electrical connection components within the housing 22 from the end cover 21 to reduce the risk of short circuits. For example, the insulating member may be made of plastic, rubber, or the like.

The housing 22 is a component used to cooperate with the end cover 21 to form an internal environment of the battery cell 20, where the formed internal environment can be used to accommodate the cell assembly 23, electrolyte, and other components. The housing 22 and the end cover 21 may be independent components, and an opening may be provided on the housing 22, where the end cover 21 covers the opening to form the internal environment of the battery cell 20. Without limitation, the end cover 21 and the housing 22 may also be integrated. Specifically, the end cover 21 and the housing 22 may form a common connection surface before other components are placed into the housing, and when the interior of the housing 22 needs to be sealed, the end cover 21 covers the housing 22. The housing 22 may be of various shapes and sizes, such as a rectangular shape, a cylindrical shape, and a hexagonal prism shape. Specifically, the shape of the housing 22 may be determined based on the specific shape and size of the cell assembly 23. The housing 22 may be made of various materials, such as copper, iron, aluminum, stainless steel, aluminum alloy, and plastic, which is not particularly limited in the embodiments of this application.

The cell assembly 23 is a component in the battery cell 20 in which electrochemical reactions occur. The housing 22 may include one or more cell assemblies 23. The cell assembly 23 is mainly formed by winding or stacking a cathode electrode plate and an anode electrode plate, and a separator is generally provided between the cathode electrode plate and the anode electrode plate. Parts of the cathode electrode plate and the anode electrode plate with active material constitute a main body of the cell assembly, and parts of the cathode electrode plate and the anode electrode plate without active material each constitute a tab 23a. The cathode tab and the anode tab may be located together at one end of the main body or may be located at both ends of the main body, respectively. During the charging and discharging process of the battery, the cathode active material and the anode active material react with the electrolyte, and the tab 23a connects to the electrode terminal to form a current loop.

Figure 4:
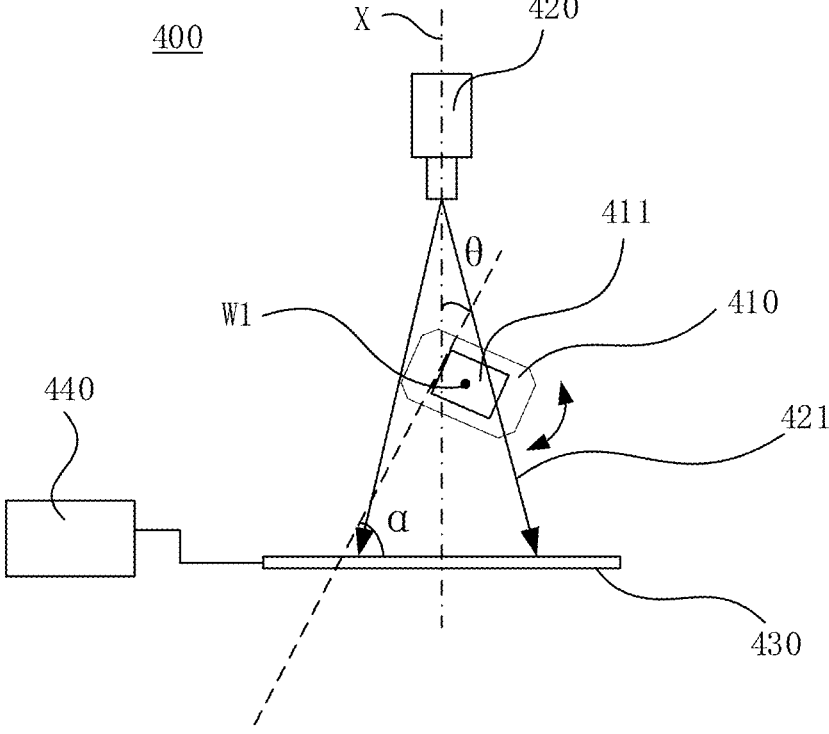
FIG. 4 is a schematic structural diagram of a battery defect inspection device according to some embodiments of this application.
Figure 5:
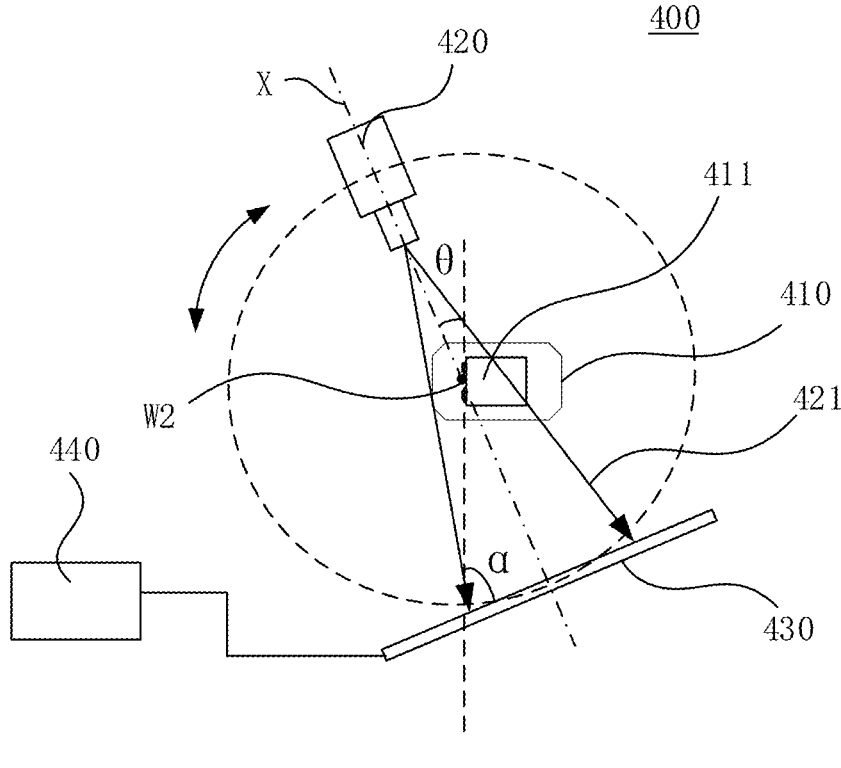
FIG. 5 is a schematic structural diagram of a battery defect inspection device according to some embodiments of this application.

Referring to FIG. 4 and FIG. 5, FIG. 4 is a schematic structural diagram of a battery defect inspection device 400 according to some embodiments of this application, and FIG. 5 is a schematic structural diagram of a battery defect inspection device 400 according to some embodiments of this application. The embodiments of this application provide a battery defect inspection device 400, including a ray source 420, a detector 430, and a supporting component 410 located between the ray source 420 and the detector 430, where the supporting component 410 is configured to support a battery under inspection 411, the supporting component 410 includes a supporting surface, and the battery under inspection 411 is configured to be located on the supporting surface. The battery defect inspection device 400 further includes a rotation mechanism (not shown in the figures). As shown in FIG. 4, the rotation mechanism is configured to rotate the supporting component 410 along a preset rotation axis, or as shown in FIG. 5, the rotation mechanism is configured to rotate the ray source 420 and the detector 430 along a preset rotation axis, such that an optical axis X of rays 421 emitted by the ray source 420 is projected obliquely onto a surface of the battery under inspection 411, and the detector 430 is configured to receive rays 421 penetrating the battery under inspection 411 to obtain an initial image, where the initial image is used for defect inspection of the battery under inspection 411.

The supporting component 410 may be any supporting structure and may fix the battery under inspection 411 by supporting or clamping, such as using a tray, a clamp, or the like. The battery under inspection 411 may be the battery cell 20 in the above embodiments or may be a battery 100 including multiple battery cells 20.

The battery under inspection 411 is configured to be located on the supporting surface, where the supporting surface is a surface of the supporting component 410 in contact with the battery under inspection 411. Here, a large surface of the battery under inspection 411 may be configured to abut against the supporting surface.

The ray source 420 is a device for emitting rays, mainly including a ray tube and a corresponding power supply, where the rays 421 may be X-rays or other rays, and the ray tube may emit corresponding detection rays, such as an X-ray tube or a y-ray tube. The ray source 420 may be open-type (open tube) or closed-type (closed tube). In one example, the ray source 420 is an X-ray source, and the rays 421 emitted are X-rays. When the rays 421 emitted by the ray source 420 pass through the battery under inspection 411, the optical axis X of the rays 421 emitted by the ray source 420 is projected obliquely onto the surface of the battery under inspection 411, where the surface of the battery under inspection 411 may be an end surface of the battery under inspection 411, and the surface of the battery under inspection 411 may also include other surfaces of the battery under inspection 411 except the end surface, where the end surface of the battery under inspection 411 may be the plane on which the end cover 21 is located in the above embodiments.

There is at least an included angle $\theta$ between the optical axis X of the rays 421 emitted by the ray source 420 and the end surface of the battery under inspection 411. Due to the presence of this included angle $\theta$, the occlusion between individual internal structures of the battery under inspection 411 is reduced. The optical axis X of the rays 421 may be the central axis of multiple rays 421 or the symmetry axis of the rays emitted by the ray source 420.

The detector 430 is a two-dimensional flat panel detector, and the detector 430 may be an indirect flat panel detector.

As shown in FIG. 4, the supporting component 410 can rotate along a preset rotation axis W1 to change the included angle $\theta$ between the end surface of the battery under inspection 411 supported on the supporting component 410 and the optical axis X of the rays 421 emitted by the ray source 420, such that the rays 421 can pass through the battery under inspection 411 at the angle $\theta$, thereby reducing occlusion between individual structures in the battery under inspection 411, so that the cathode tab and the anode tab can be clearly captured together during imaging. This occlusion may be the occlusion of one tab by another tab or the occlusion of any tab by other connectors or adapters.

As shown in FIG. 5, the ray source 420 and the detector 430 as a whole can rotate along a preset rotation axis W2 to change the included angle $\theta$ between the end surface of the battery under inspection 411 supported on the supporting component 410 and the optical axis X of the rays 421 emitted by the ray source 420, such that the rays 421 can pass through the battery under inspection 411 at the angle $\theta$, thereby reducing occlusion between individual structures in the battery under inspection 411, so that the cathode tab and the anode tab can be clearly captured together during imaging. This occlusion may be the occlusion of one tab by another tab or the occlusion of any tab by other connectors or adapters.

Depending on the rotating body (the supporting component or the combination of the ray source and the detector) rotated by the rotation mechanism, the position of the preset rotation axis may be the same or different.

The rotation mechanism may be electrically rotated and controlled by an external program, or the rotation mechanism may be a purely manual rotation structure, allowing for manual rotational adjustment. It can be understood that any mechanism that can be installed on the rotating body (the supporting component or the combination of the ray source and the detector) and can drive the rotating body to rotate can be considered a rotation mechanism in this application.

In the technical solutions of the embodiments of this application, the battery under inspection 411 can be inspected through the ray source 420, the detector 430, and the supporting component 410. The rotation mechanism may be provided to flexibly adjust the included angle θ between the end surface of the battery under inspection 411 and the plane on which the detector 430 is located according to the needs of different inspection scenarios, which can to some extent reduce occlusion between individual internal structures of the battery and to some extent enable all of the individual internal structures of the battery to be clearly captured during imaging. In some examples, to some extent, this enables at least the cathode tab and the anode tab to be clearly captured together during imaging.

The rotation mechanism is configured to rotate the supporting component 410 along a preset rotation axis, or the rotation mechanism is configured to rotate the ray source 420 and the detector 430 along a preset rotation axis. Based on the above two adjustment methods, adjusting at least the angle θ between the end surface of the battery under inspection 411 and the plane on which the detector 430 is located can to some extent alleviate the issue of unclear imaging of some internal structures of the battery due to a fixed imaging angle, enhancing the quality of the inspection image and to some extent improving the accuracy of image recognition.

According to some embodiments of this application, the battery defect inspection device 400 further includes a defect inspection unit 440 connected to the detector 430, where the defect inspection unit 440 is configured to perform defect inspection on the battery under inspection 411 based on the initial image.

The defect inspection unit 440 may be any computer device or a processor built into the battery defect inspection device 400.

The initial image may be directly acquired by the detector 430 or may be obtained through conversion of electrical signals generated by the detector 430 to reconstruct an image of the object under inspection.

The defect inspection unit 440 may further be preconfigured with a corresponding image recognition algorithm. By performing recognition on the initial image, a corresponding inspection result can be obtained, and based on the inspection result, it can be determined whether the battery under inspection 411 has any abnormalities.

With the defect inspection unit 440 provided to receive the electrical signal or the indirectly generated initial image from the detector 430 and output an inspection result of the battery under inspection 411, automatic inspection of internal defects of the battery under inspection 411 can be achieved, improving the automation level and inspection efficiency of the battery inspection device.

According to some embodiments of this application, the battery under inspection 411 includes an end surface, where the end surface is a plane on which a battery end cover is located; in a direction perpendicular to the supporting surface, a projection of a middle region of the end surface of the battery under inspection 411 on the supporting surface is located within a middle region of the supporting surface; and the rays 421 emitted by the ray source 420 are configured to be projected at least obliquely onto the middle region of the end surface of the battery under inspection 411.

The supporting surface includes a middle region and an edge region surrounding the middle region. When the supporting surface is a centrally symmetric shape, the middle region of the supporting surface may be the geometric center of the supporting surface, or the middle region of the supporting surface may be a region extending from the geometric center toward the edge region.

The battery under inspection 411 is configured to be located on the supporting surface, where the supporting surface is a surface of the supporting component 410 in contact with the battery under inspection 411. Here, a large surface of the battery under inspection 411 may be configured to abut against the supporting surface, or a side surface of the battery under inspection 411 is configured to abut against the supporting surface. When the large surface of the battery under inspection 411 is configured to abut against the supporting surface, the middle region of the battery under inspection 411 is located within the middle region of the supporting surface. As a feasible implementation, the battery under inspection 411 is placed on the supporting surface in at least a centered manner.

If the rays 421 emitted by the ray source 420 travel from an edge of the battery end surface toward the center of the battery, due to the higher compaction density of the tabs, the grayscale value in the image is darker, and the tab morphology is difficult to detect. In this case, the tab in the image is closer to the central region of the battery and is occluded by structures such as the cell top cover adapter, making the tab structure in the image more blurred. Therefore, it is necessary to make the optical axis X of the rays 421 emitted by the ray source 420 as close as possible to the middle of the end surface of the battery under inspection, so that more rays 421 pass through the center of the end surface of the battery under inspection, improving the clarity of the tab structure imaging.

Since the projection of the central region of the end surface of the battery under inspection 411 on the supporting surface is located within the central region of the supporting surface, when the optical axis of the rays emitted by the ray source 420 is projected above the middle region of the supporting surface, the rays can travel from the middle region of the end surface of the battery under inspection 411 toward an edge of the battery under inspection 411, to some extent reducing occlusion of tab imaging by a cell top cover adapter, allowing clearer imaging of tab morphology and to some extent improving the accuracy of image recognition.

According to some embodiments of this application, the preset rotation axis is perpendicular to the supporting surface.

The battery under inspection 411 is configured to be located on the supporting surface, where the supporting surface is a surface of the supporting component 410 in contact with the battery under inspection 411.

The supporting component 410 can rotate along a preset rotation axis W1 to change the included angle θ between the end surface of the battery under inspection 411 supported on the supporting component 410 and the optical axis X of the rays 421 emitted by the ray source 420. The ray source 420 and the detector 430 as a whole can also rotate along a preset rotation axis W2 to change the included angle θ between the end surface of the battery under inspection 411 supported on the supporting component 410 and the optical axis X of the rays 421 emitted by the ray source 420.

The preset rotation axis is perpendicular to the rotation plane. When the preset rotation axis is not perpendicular to the supporting surface, there is an included angle between the rotation plane and the supporting surface, which may cause the supporting component 410 to occlude the rays 421 emitted by the ray source 420 during the rotation of the rotation mechanism.

When the supporting component 410 is rotated along the preset rotation axis, or when the ray source 420 and the detector 430 are rotated along the preset rotation axis, rotation occurs within the supporting surface, which can to some extent reduce occlusion of the rays 421 by the supporting surface and increase the stability of rotation.

According to some embodiments of this application, the preset rotation axis at least passes through a middle region of the supporting surface.

The supporting surface includes a middle region and an edge region surrounding the middle region. When the supporting surface is a centrally symmetric shape, the middle region of the supporting surface may be the geometric center of the supporting surface, or the middle region of the supporting surface may be a region extending from the geometric center toward the edge region.

The supporting component 410 can rotate along a preset rotation axis W1 to change the included angle θ between the end surface of the battery under inspection 411 supported on the supporting component 410 and the optical axis X of the rays 421 emitted by the ray source 420. The ray source 420 and the detector 430 as a whole can also rotate along a preset rotation axis W2 to change the included angle θ between the end surface of the battery under inspection 411 supported on the supporting component 410 and the optical axis X of the rays 421 emitted by the ray source 420.

When the preset rotation axes W1 and W2 are located in the central region of the supporting surface, since the projection of the middle region of the end surface of the battery under inspection 411 on the supporting surface is located within the middle region of the supporting surface, regardless of how the rotating body of the rotation mechanism (the supporting component or the combination of the ray source and the detector) rotates, most of the rays 421 emitted by the ray source 420 will pass through the middle region of the end surface of the battery under inspection 411.

Specifically, during rotation, most of the rays 421 emitted by the ray source 420 can to some extent be controlled and always be projected obliquely onto the middle region of the supporting surface, that is, onto the central region of the end surface of the battery under inspection 411, improving the consistency and stability of the inspection.

According to some embodiments of this application, the surface of the battery under inspection 411 includes an end surface, and an included angle α between the end surface of the battery under inspection 411 and a plane on which the detector 430 is located satisfies: 0°≤α≤45°.

The end surface of the battery under inspection 411 may be the plane on which the end cover 21 is located in the above embodiments.

Due to the positional relationship between the ray source 420 and the detector 430, the optical axis X of the rays 421 of the ray source 420 is usually perpendicular to the plane on which the detector 430 is located. Therefore, the included angle α between the end surface of the battery under inspection 411 and the plane on which the detector 430 is located, and the included angle θ between the end surface of the battery under inspection 411 and the optical axis X of the rays 421 emitted by the ray source 420 have a relationship that satisfies α+θ=90°.

A reasonable rotation angle adjustment allows clearer imaging of individual internal structures of the battery and improves, to some extent, the inspection accuracy of the morphology of the two tabs inside the battery.

Figure 6:
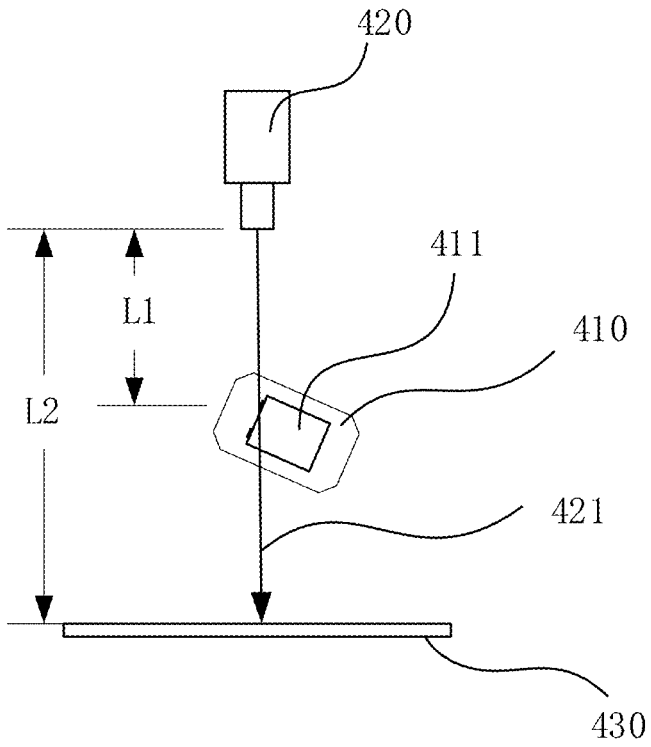
FIG. 6 is a schematic structural diagram of a battery defect inspection device according to some embodiments of this application.

Referring to FIG. 6, FIG. 6 is a schematic structural diagram of a battery defect inspection device 400 according to some embodiments of this application. According to some embodiments of this application, the battery defect inspection device 400 further includes a first adjustment mechanism (not shown in the figure), where the first adjustment mechanism is connected to the supporting component 410 and is configured to drive the supporting component 410 to move to adjust a distance L1 between the supporting component 410 and the ray source 420.

According to the principle of similar triangles, the magnification of the battery defect inspection device 400 is related to the distance L1 between the supporting component 410 and the ray source 420. L1 may be the distance between a reference plane of the ray source 420 and a reference plane of the supporting component 410, where, according to actual measurement needs, the reference plane may be an arbitrarily selected plane on the ray source 420 and the supporting component 410. For ease of measuring L1, the two reference planes may be parallel to each other.

If the magnification is too small, the magnification effect cannot be effectively achieved; if the magnification is too large, it may lead to unclear inspection images, affecting the inspection performance.

Adjusting the distance L1 between the supporting component 410 and the ray source 420 can control the magnification of the battery defect inspection device 400, enabling the initial image to achieve a magnification effect while also to some extent adjusting the imaging quality. The size of a radiation surface irradiated on the surface of the battery under inspection 411 can also be controlled. When the distance between the ray source 420 and the supporting component 410 is small, the radiation surface of the rays 421 on the surface of the battery under inspection 411 is also relatively small, and only a partial region of the battery is irradiated by the rays, which thus can enhance the inspection accuracy of local details to some extent. When the distance L1 between the ray source 420 and the supporting component 410 increases, the radiation surface of the rays 421 on the surface of the battery under inspection 411 also increases accordingly, thereby covering a larger inspection surface and to some extent reducing the possibility of missed inspection.

According to some embodiments of this application, a second adjustment mechanism (not shown in the figure) is provided, where the second adjustment mechanism is connected to the ray source 420 and is configured to drive the ray source 420 to move to adjust a distance L2 between the ray source 420 and the detector 430, or the second adjustment mechanism is connected to the detector 430 and is configured to drive the detector 430 to move to adjust a distance L2 between the ray source 420 and the detector 430.

According to the principle of similar triangles, the magnification of the battery defect inspection device 400 is also related to the distance L2 between the ray source 420 and the detector 430. L2 may be the distance between a reference plane of the ray source 420 and a reference plane of the detector 430, where, according to actual measurement needs, the reference plane may be an arbitrarily selected plane on the ray source 420 and the detector 430. For ease of measuring L2, the two reference planes may be parallel to each other.

If the magnification is too small, the magnification effect cannot be effectively achieved; if the magnification is too large, it may lead to unclear inspection images, affecting the inspection performance.

Adjusting the distance between the ray source 420 and the detector 430 allows adaptation to the inspection of different types of batteries. Moreover, the magnification of the battery defect inspection device 400 is also related to the distance L2 between the ray source 420 and the detector 430. If the magnification is too small, the magnification effect cannot be effectively achieved; if the magnification is too large, it may lead to unclear initial images, affecting the inspection performance. Therefore, adjusting the distance L2 between the ray source 420 and the detector 430 can control the magnification of the battery defect inspection device 400, enabling the initial image to achieve a magnification effect while also to some extent adjusting the imaging quality.

According to some embodiments of this application, a rated voltage V of the ray source 420 satisfies: 130 kV (kV)≤150 kV, and/or a rated current I of the ray source 420 satisfies: I≤500 μA (μA).

The energy of the rays emitted by the ray source 420 is related to the voltage U of the ray source 420; and a higher voltage U of the ray source 420 indicates greater energy of the rays emitted by the ray source 420. The intensity of the rays emitted by the ray source 420 is also related to the current I of the ray source 420; and a higher current I of the ray source 420 indicates greater intensity of the rays emitted by the ray source 420.

The battery defect inspection device 400 inspects the interior of the battery under inspection 411, where at least the morphology and structure of the tabs need to be inspected. Therefore, in inspecting the tabs, the voltage U of the ray source 420 and the current I of the ray source 420 should at least satisfy that the rays can penetrate the tabs.

The rated voltage V of the ray source 420 is set to satisfy: 130 kV≤V≤150 kV, and/or the rated current I of the ray source 420 is set to satisfy: I≤500 μA, the rays emitted by the ray source 420 can penetrate the tabs of the battery for inspection while avoiding overexposure that may affect the accuracy of inspection.

Figure 7:
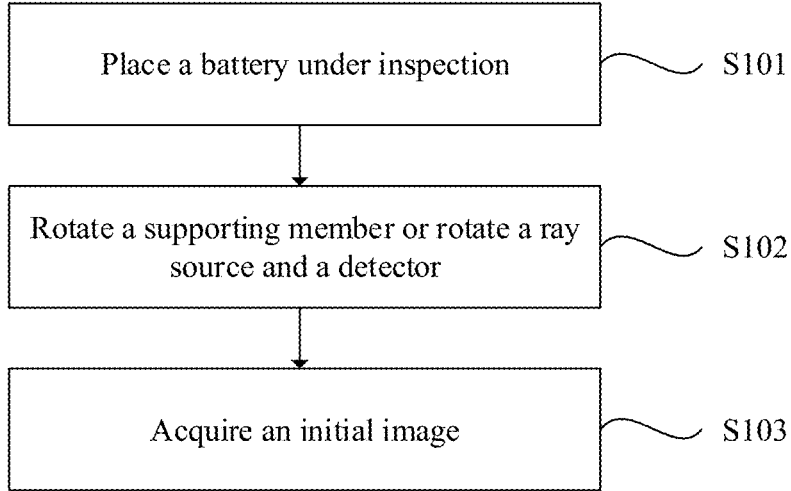
FIG. 7 is a schematic flowchart of a battery defect inspection method according to some embodiments of this application.

A second aspect of this application provides a battery defect inspection method using the battery defect inspection device 400 according to any one of the above embodiments. Referring to FIG. 7, FIG. 7 is a schematic flowchart of a battery defect inspection method according to some embodiments of this application. The battery defect inspection method performed by the battery defect inspection device 400 includes:

step S101: responding to the battery under inspection 411 being placed on the supporting component 410;

step S102: rotating the supporting component 410 along a preset rotation axis, or rotate the ray source 420 and the detector 430 along a preset rotation axis, such that an optical axis X of rays 421 emitted by the ray source 420 is projected obliquely onto a surface of the battery under inspection 411; and step S103: acquiring an initial image obtained by the detector 430 by receiving rays penetrating the battery under inspection 411, where the initial image is used for defect inspection of the battery under inspection 411.

The supporting component 410 may be any supporting structure and may fix the battery under inspection 411 by supporting or clamping, such as using a tray, a clamp, or the like. The battery under inspection 411 may be the battery cell 20 in the above embodiments or may be a battery 100 including multiple battery cells 20.

The battery under inspection 411 is configured to be located on the supporting surface, where the supporting surface is a surface of the supporting component 410 in contact with the battery under inspection 411. Here, a large surface of the battery under inspection 411 may be configured to abut against the supporting surface, or a side surface of the battery under inspection 411 is configured to abut against the supporting surface.

The supporting component 410 can rotate along a preset rotation axis W1 to change the included angle θ between the end surface of the battery under inspection 411 supported on the supporting component 410 and the optical axis X of the rays 421 emitted by the ray source 420. The ray source 420 and the detector 430 as a whole can also rotate along a preset rotation axis W2 to change the included angle θ between the end surface of the battery under inspection 411 supported on the supporting component 410 and the optical axis X of the rays 421 emitted by the ray source 420.

The rays 421 can pass through the battery under inspection 411 at the angle θ, thereby reducing occlusion between various structures in the battery under inspection 411, so that the cathode tab and the anode tab can be clearly captured together during imaging. This occlusion may be the occlusion of one tab by another tab or the occlusion of any tab by other connectors or adapters.

To ensure image inspection quality, the detector 430 needs to be calibrated before each inspection or each time the battery defect inspection device 400 is turned on.

The rotation of the supporting component 410 along a preset rotation axis or the rotation of the ray source 420 and the detector 430 along a preset rotation axis can be achieved using an electrically rotated rotation mechanism or a manually rotated rotation mechanism. Specifically, the rotation mechanism may be electrically rotated and controlled by an external program, or the rotation mechanism may be a purely manual rotation structure, allowing for manual rotational adjustment. It can be understood that any mechanism that can be installed on the rotating body (the supporting component or the combination of the ray source and the detector) and can drive the rotating body to rotate can be considered a rotation mechanism in this application.

The relative angle between the battery under inspection 411 and the rays emitted by the ray source 420 can be flexibly adjusted according to the needs of different inspection scenarios, which can to some extent reduce occlusion between individual internal structures of the battery and enable all of the individual internal structures of the battery to be clearly captured during imaging. This can to some extent alleviate the issue of unclear imaging of some internal structures of the battery due to a fixed imaging angle, enhancing the quality of the inspection image and improving the accuracy of image recognition.

According to some embodiments of this application, the surface of the battery under inspection 411 includes an end surface, and an optical axis X of rays 421 emitted by the ray source 420 is projected obliquely onto the surface of the battery under inspection 411 to at least form an included angle between the end surface and a plane on which the detector 430 is located where the included angle is configured to satisfy:

A projection of a cathode tab of the battery under inspection 411, formed on a plane on which an anode tab is located based on rays projected onto the cathode tab, is offset from a region in which the anode tab is located, or an overlapping area between the two is less than a preset value.

Due to the higher compaction density of copper and the lower compaction density of aluminum, the grayscale value of copper tabs (anode tabs) during imaging is higher than that of aluminum tabs (cathode tabs). During vertical inspection, if the copper tab side is closer to the ray source, its magnification is greater, which may cause the copper tab (anode tab) to occlude most of the aluminum tab (cathode tab) during imaging, resulting in unclear imaging of the cathode tab.

Therefore, during rotation, the cathode tab side of the battery under inspection 411 is positioned closer to the ray source than the anode tab side, such that a projection of the cathode tab of the battery under inspection, formed on a plane on which the anode tab is located based on rays projected onto the cathode tab, is offset from a region in which the anode tab is located, reducing occlusion of the cathode tab imaging by the anode tab. This to some extent improves the imaging clarity of the cathode tab.

Adjusting the included angle between the end surface of the battery under inspection 411 and the plane on which the detector 430 is located can at least partially offset the cathode tab and the anode tab in the imaging direction, thereby reducing occlusion of one by the other, to some extent improving the imaging clarity of the two and further improving image recognition accuracy to enhance the sampling efficiency of inspection images.

According to some embodiments of this application, the surface of the battery under inspection 411 includes a side surface, and the preset rotation axis is perpendicular to the side surface of the battery under inspection 411.

The battery under inspection 411 is placed on the supporting surface, where the supporting surface is a surface of the supporting component 410 in contact with the battery under inspection 411. The side surface of the battery under inspection 411 is specifically the large surface of the battery under inspection 411.

The supporting component 410 can rotate along a preset rotation axis W1 to change the included angle θ between the end surface of the battery under inspection 411 supported on the supporting component 410 and the optical axis X of the rays 421 emitted by the ray source 420. The ray source 420 and the detector 430 as a whole can also rotate along a preset rotation axis W2 to change the included angle θ between the end surface of the battery under inspection 411 supported on the supporting component 410 and the optical axis X of the rays 421 emitted by the ray source 420.

The preset rotation axis is perpendicular to the rotation plane. When the preset rotation axis is not perpendicular to the supporting surface, there is an included angle between the rotation plane and the supporting surface, which may cause the supporting component 410 to occlude the rays 421 emitted by the ray source 420 during the rotation of the rotation mechanism.

The preset rotation axis is perpendicular to the large surface of the battery under inspection 411. During rotation, the large surface of the battery always remains in the same plane, improving imaging consistency and stability after rotation and thereby enhancing the inspection performance. Moreover, the preset rotation axis is perpendicular to the supporting surface, such that the rotation process is centered around the center of the battery under inspection 411, to some extent allowing more rays to pass through the tested surface of the battery under inspection 411, thereby enhancing the inspection performance.

According to some embodiments of this application, an optical axis X of rays 421 emitted by the ray source 420 is projected obliquely onto a middle region of the end surface of the battery under inspection 411.

The supporting surface includes a middle region and an edge region surrounding the middle region. When the supporting surface is a centrally symmetric shape, the middle region of the supporting surface may be the geometric center of the supporting surface, or the middle region of the supporting surface may be a region extending from the geometric center toward the edge region.

If the rays 421 emitted by the ray source 420 travel from an edge of the battery end surface toward the center of the battery, due to the higher compaction density of the tabs, the grayscale value in the image is darker, and the tab morphology is difficult to detect. In this case, the tab in the image is closer to the central region of the battery and is occluded by structures such as the cell top cover adapter, making the tab structure in the image more blurred. Therefore, it is necessary to make the optical axis X of the rays 421 emitted by the ray source 420 as close as possible to the middle of the end surface of the battery under inspection, so that more rays 421 pass through the center of the end surface of the battery under inspection, improving the clarity of the tab structure imaging.

Since the projection of the central region of the end surface of the battery under inspection 411 on the supporting surface is located within the central region of the supporting surface, when the rays 421 emitted by the ray source 420 are projected onto the middle region of the supporting surface, the rays can travel from the middle region of the battery end surface toward an edge region of the battery, to some extent reducing occlusion of tab imaging by a cell top cover adapter, allowing clearer imaging of tab morphology and to some extent improving the accuracy of image recognition.

According to some embodiments of this application, a distance between the ray source 420 and the detector 430 and/or a distance between the supporting component 410 and the ray source 420 is adjusted in a direction perpendicular to the plane on which the detector 430 is located.

According to the principle of similar triangles, the magnification of the inspection device is related to the distance between the ray source 420 and the detector 430 and/or the distance between the supporting component 410 and the ray source 420. If the magnification is too small, the magnification effect cannot be effectively achieved; if the magnification is too large, it may lead to unclear initial images, affecting the inspection performance.

Adjusting the distance between the ray source 420 and the detector 430 and/or the distance between the supporting component 410 and the ray source 420 can control the magnification of the inspection device, enabling the initial image to achieve a magnification effect while also to some extent adjusting the imaging quality.

The size of a radiation surface irradiated on the surface of the battery under inspection 411 can also be controlled. When the distance between the ray source 420 and the supporting component 410 is small, the radiation surface of the rays on the surface of the battery under inspection is also relatively small, and only a partial region of the battery is irradiated by the rays, which can enhance the inspection accuracy of local details to some extent. When the distance between the ray source 420 and the supporting component 410 increases, the radiation surface of the rays on the surface of the battery under inspection also increases accordingly, thereby covering a larger inspection surface and to some extent reducing the possibility of missed inspection.

According to some embodiments of this application, in response to an inspection result of the battery under inspection being unqualified, the battery under inspection is rejected or subjected to re-inspection.

When the detected tab in the initial image of the battery under inspection shows a downward insertion trend, or the detected tabs have already been inserted downward into the electrode plate, the tab morphology of the battery under inspection is considered unqualified, and the battery under inspection is deemed a risk item and needs to be rejected or subjected to re-inspection.

An inspection result of the battery under inspection is output through the initial image, and automatic inspection of internal defects of the battery under inspection can be achieved, improving the automation level and inspection efficiency of the battery inspection device.

Figure 8:
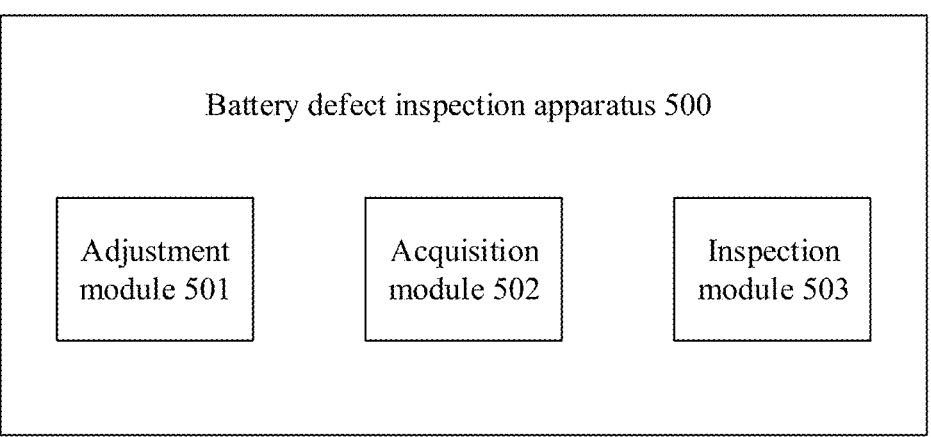
FIG. 8 is a structural block diagram of a battery defect inspection apparatus according to some embodiments of this application.

Referring to FIG. 8, FIG. 8 is a structural block diagram of a battery defect inspection apparatus 500 according to some embodiments of this application. A third aspect of this application provides a battery defect inspection apparatus, the apparatus including an adjustment module 501 and an acquisition module 502, where the adjustment module 501 is configured to, in response to the battery under inspection 411 being placed on the supporting component 410, adjust an included angle between the end surface of the supporting component 410 and a plane on which the detector 430 is located, that is, adjust the supporting component 410 along a preset rotation axis, or adjust the ray source 420 and the detector 430 along a preset rotation axis, such that an optical axis X of rays 421 emitted by the ray source 420 is projected obliquely onto a surface of the battery under inspection 411; and the acquisition module 502 is configured to acquire an initial image obtained by the detector 430 by receiving rays penetrating the battery under inspection 411, where the initial image is used for defect inspection of the battery under inspection 411.

According to some embodiments of this application, the relative angle between the battery under inspection and the rays emitted by the ray source can be flexibly adjusted according to the needs of different inspection scenarios, which can to some extent reduce occlusion between individual internal structures of the battery and to some extent enable all of the individual internal structures of the battery to be clearly captured during imaging. This can to some extent alleviate the issue of unclear imaging of some internal structures of the battery due to a fixed imaging angle, enhancing the quality of the inspection image and to some extent improving the accuracy of image recognition.

According to some embodiments of this application, the battery defect inspection apparatus 500 further includes an inspection module 503, where the inspection module 503 is configured to perform defect inspection on the battery under inspection based on the initial image.

Inspection of internal defects of the battery under inspection can be achieved by configuring the inspection module 503 to receive the initial image generated by the detector and analyze the initial image to output an inspection result of the battery under inspection, improving the automation level and inspection efficiency of the battery defect inspection apparatus.

A fourth aspect of this application provides an electronic device, including at least one processor; and a memory communicatively connected to the at least one processor; where the memory stores instructions executable by the at least one processor, and the instructions are executed by the at least one processor to enable the at least one processor to perform the battery defect inspection method according to any one of the above embodiments.

Figure 9:
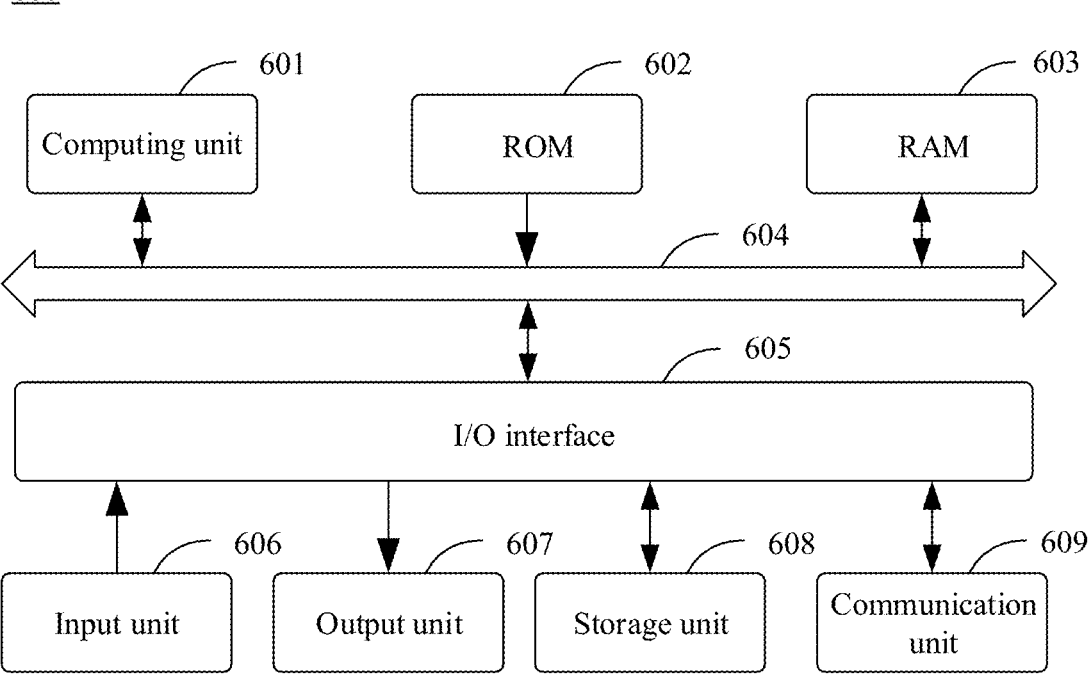
FIG. 9 is a structural block diagram of an electronic device according to some embodiments of this application.

Referring to FIG. 9, FIG. 9 is a structural block diagram of an electronic device 600 according to some embodiments of this application, which is an example of a hardware device that can be applied to various aspects of this application. The electronic device is intended to represent various forms of digital electronic computer devices, such as laptops, desktops, workstations, personal digital assistants, servers, blade servers, mainframes, and other suitable computers. The electronic device may also represent various forms of mobile devices, such as personal digital assistants, cellular phones, smartphones, wearable devices, and other similar computing devices. The components shown herein, their connections and relationships, and their functions are merely examples and are not intended to limit the implementation of this application described and/or claimed herein.

As shown in FIG. 9, the device 600 includes a computing unit 601, which can perform various appropriate actions and processes according to a computer program stored in a read-only memory (ROM) 602 or a computer program loaded from a storage unit 608 into a random-access memory (RAM) 603. In the RAM 603, various programs and data required for the operation of the device 600 can also be stored. The computing unit 601, the ROM 602, and the RAM 603 are connected to each other via a bus 604. An input/output (I/O) interface 605 is also connected to the bus 604.

Multiple components in the device 600 are connected to the I/O interface 605, including: an input unit 606, an output unit 607, a storage unit 608, and a communication unit 609. The input unit 606 may be any type of device capable of inputting information to the device 600, and the input unit 606 can receive input numeric or character information and generate key signal inputs related to user settings and/or function control of the electronic device, and may include but is not limited to a mouse, a keyboard, a touchscreen, a trackpad, a trackball, a joystick, a microphone, and/or a remote control. The output unit 607 may be any type of device capable of presenting information and may include, but is not limited to, a display, a speaker, a video/audio output terminal, a vibrator, and/or a printer. The storage unit 608 may include, but is not limited to, a magnetic disk or an optical disk. The communication unit 609 allows the device 600 to exchange information/data with other devices through a computer network such as the Internet and/or various telecommunication networks and may include, but is not limited to, a modem, a network card, an infrared communication device, a wireless communication transceiver, and/or a chipset, such as a Bluetooth device, an 802.11 device, a WiFi device, a WiMax device, a cellular communication device, and/or the like.

The computing unit 601 may be various general-purpose and/or special-purpose processing components with processing and computing capabilities. Some examples of the computing unit 601 include, but are not limited to, a central processing unit (CPU), a graphics processing unit (GPU), various specialized artificial intelligence (AI) computing chips, various computing units running machine learning model algorithms, a digital signal processor (DSP), and any suitable processor, controller, microcontroller, and the like. The computing unit 601 performs the various methods and processes described above. For example, in some embodiments, the battery defect inspection method according to any one of the above embodiments may be implemented as a computer software program tangibly contained in a machine-readable medium, such as the storage unit 608. In some embodiments, part or all of the computer program may be loaded and/or installed onto the device 600 via the ROM 602 and/or the communication unit 609. When the computer program is loaded into the RAM 603 and executed by the computing unit 601, one or more steps of the battery defect inspection method according to any one of the above embodiments may be performed. Alternatively, in other embodiments, the computing unit 601 may be configured to perform the battery defect inspection method according to any one of the above embodiments by any other suitable means (for example, by means of firmware).

The machine-readable medium may be a tangible medium that can contain or store a program for use by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium would include an electrical connection based on one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

According to some embodiments of this application, as shown in FIG. 5 to FIG. 7, the embodiments of this application provide a battery defect inspection device 400, including a ray source 420, a detector 430, and a supporting component 410 located between the ray source 420 and the detector 430, where the supporting component 410 is configured to support a battery under inspection 411, the supporting component 410 includes a supporting surface, and the battery under inspection 411 is configured to be located on the supporting surface. The battery defect inspection device 400 further includes a rotation mechanism. As shown in FIG. 4, the rotation mechanism is configured to rotate the supporting component 410 along a preset rotation axis, or as shown in FIG. 5, the rotation mechanism is configured to rotate the ray source 420 and the detector 430 along a preset rotation axis, such that an optical axis X of rays 421 emitted by the ray source 420 is projected obliquely onto a surface of the battery under inspection 411, and the detector 430 is configured to receive rays 421 penetrating the battery under inspection 411 to obtain an initial image, where the initial image is used for defect inspection of the battery under inspection 411.

The battery defect inspection method performed by the battery defect inspection device 400 includes:

step S101: responding to the battery under inspection 411 being placed on the supporting component 410;

step S102: rotating the supporting component 410 along a preset rotation axis, or rotate the ray source 420 and the detector 430 along a preset rotation axis, such that an optical axis X of rays 421 emitted by the ray source 420 is projected obliquely onto a surface of the battery under inspection 411; and step S103: acquiring an initial image obtained by the detector 430 by receiving rays penetrating the battery under inspection 411, where the initial image is used for defect inspection of the battery under inspection 411.

Figure 10:
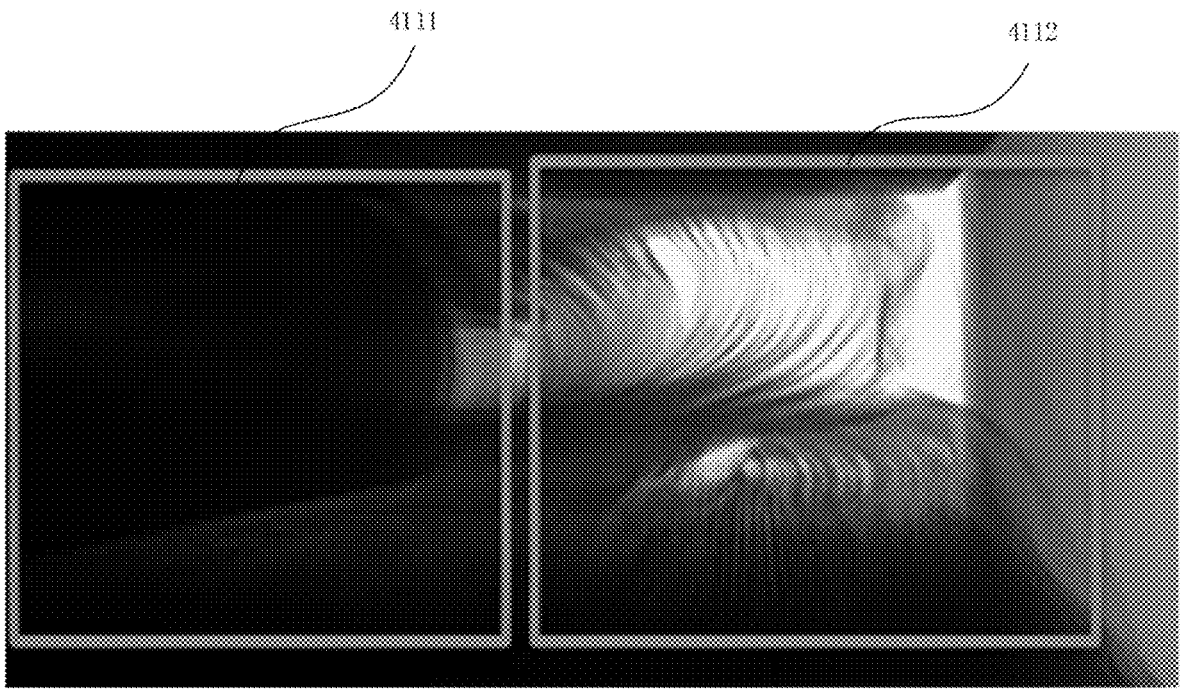
FIG. 10 is an inspection image of a battery under inspection according to some embodiments of this application.
Figure 11:
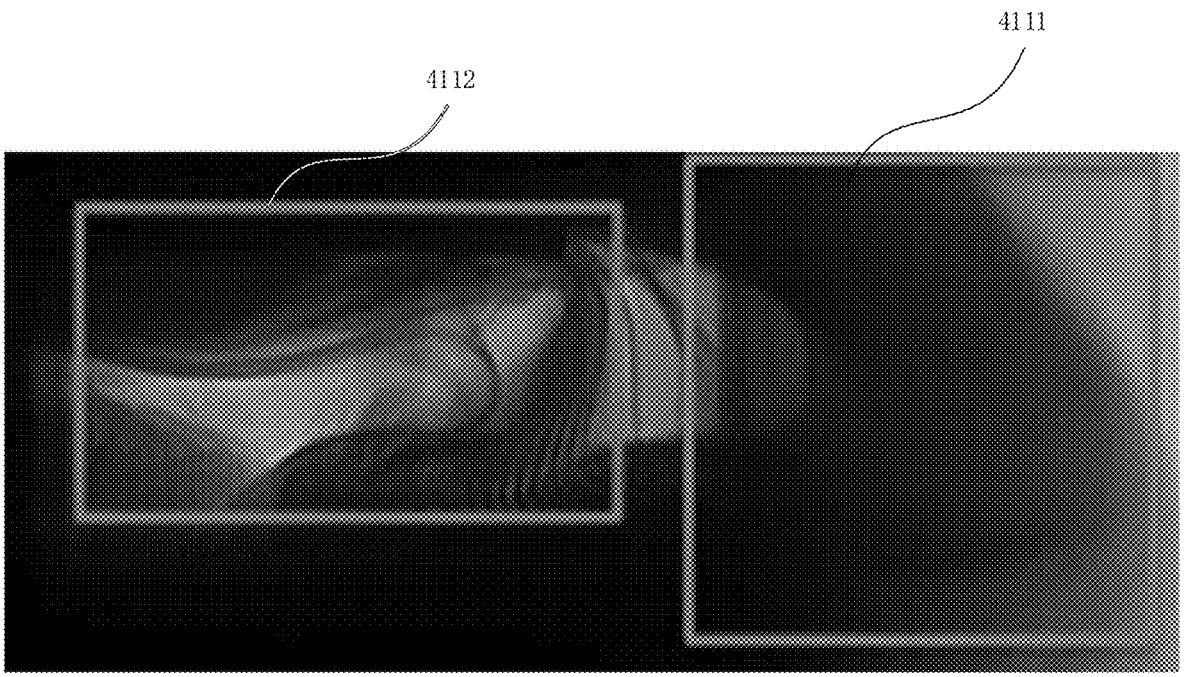
FIG. 11 is an inspection image of a battery under inspection according to some embodiments of this application.

Referring to FIG. 10 and FIG. 11, FIG. 10 is an inspection image of a battery under inspection according to some embodiments of this application, and FIG. 11 is an inspection image of a battery under inspection according to some embodiments of this application.

Due to the higher compaction density of copper and the lower compaction density of aluminum, the grayscale value of copper tabs (anode tabs) during imaging is higher than that of aluminum tabs (cathode tabs). During vertical inspection, if the copper tab side is closer to the ray source, its magnification is greater, which may cause the copper tab (anode tab) to occlude most of the aluminum tab (cathode tab) during imaging, resulting in unclear imaging of the cathode tab.

Therefore, during rotation, the cathode tab side of the battery under inspection 411 is positioned closer to the ray source than the anode tab side, such that a projection of the cathode tab of the battery under inspection, formed on a plane on which the anode tab is located based on rays projected onto the cathode tab, is offset from a region in which the anode tab is located, reducing occlusion of the cathode tab imaging by the anode tab. As shown in FIG. 10, the inspection image includes a first region 4111 for anode tab imaging and a second region 4112 for cathode tab imaging. Adjusting a first relative angle between the battery under inspection 411 and the rays emitted by the ray source 420 makes the imaging of the cathode tab on the right side clearer. As shown in FIG. 11, the inspection image includes a first region 4111 for anode tab imaging and a second region 4112 for cathode tab imaging. Adjusting a second relative angle between the battery under inspection 411 and the rays emitted by the ray source 420 makes the image of the cathode tab on the left side also clearer, thereby to some extent improving the imaging clarity of the cathode tab.

Finally, it should be noted that the above embodiments are only used to illustrate the technical solutions of this application and are not intended to limit it. Although this application has been described in detail with reference to the foregoing embodiments, those of ordinary skill in the art should understand that they can still modify the technical solutions described in the foregoing embodiments or make equivalent replacements for some or all of the technical features. Such modifications or replacements do not cause the essence of the corresponding technical solutions to depart from the scope of the technical solutions of the embodiments of this application, and they should all be included within the scope of the claims and the specification of this application. In particular, as long as there is no structural conflict, the various technical features mentioned in the embodiments can be combined in any manner. This application is not limited to the specific embodiments disclosed in this specification but includes all technical solutions falling within the scope of the claims.

The invention claimed is:

1. A battery defect inspection device comprising:

a ray source;

a detector;

a supporting component located between the ray source and the detector, configured to support a battery under inspection, the battery under inspection comprising an end surface, wherein the end surface is a plane on which a battery end cover is located, wherein the supporting component comprises a supporting surface, and the battery under inspection is configured to be located on the supporting surface;

a rotation mechanism, wherein the rotation mechanism is configured to rotate the supporting component along a preset rotation axis, or the rotation mechanism is configured to rotate the ray source and the detector along a preset rotation axis, such that an optical axis of rays emitted by the ray source is projected obliquely onto a surface of the battery under inspection to at least form an included angle between the end surface and a plane on which the detector is located, wherein the included angle is configured to satisfy that:

a projection of a cathode tab of the battery under inspection, formed on a plane on which an anode tab is located based on rays projected onto the cathode tab, is offset from a region in which the anode tab is located, or an overlapping area between the two is less than a preset value; and wherein the detector is configured to receive rays penetrating the battery under inspection to obtain an initial image, wherein the initial image is used for defect inspection of the battery under inspection.

2. The device according to claim 1, further comprising:

a defect inspection unit connected to the detector, wherein the defect inspection unit is configured to perform defect inspection on the battery under inspection based on the initial image.

3. The device according to claim 1, wherein:

in a direction perpendicular to the supporting surface, a projection of a middle region of the end surface of the battery under inspection on the supporting surface is located within a middle region of the supporting surface; and the rays emitted by the ray source are configured to be projected at least obliquely onto the middle region of the end surface of the battery under inspection.

4. The device according to claim 1, wherein:

the preset rotation axis is perpendicular to the supporting surface.

5. The device according to claim 1, wherein:

the preset rotation axis passes through a middle region of the supporting surface.

6. The device according to claim 1, wherein:

an included angle $\alpha$ between the end surface and a plane on which the detector is located satisfies: $0°\leq\alpha\leq45°$.

7. The device according to claim 1, further comprising:

a first adjustment mechanism connected to the supporting component, wherein the first adjustment mechanism is configured to drive the supporting component to move to adjust a distance between the supporting component and the ray source.

8. The device according to claim 1, further comprising:

a second adjustment mechanism, wherein the second adjustment mechanism is connected to the ray source and configured to drive the ray source to move to adjust a distance between the ray source and the detector, or the second adjustment mechanism is connected to the detector and configured to drive the detector to move to adjust a distance between the ray source and the detector.

9. The device according to claim 1, wherein:

a rated voltage V of the ray source satisfies: 130 kV$\leq$V$\leq$150 kV, and/or a rated current I of the ray source satisfies: I$\leq$500 μA.

10. A battery defect inspection method using the battery defect inspection device according to claim 1, comprising:

responding to a battery under inspection being placed on a supporting component;

rotating the supporting component along a preset rotation axis, or rotating a ray source and a detector along a preset rotation axis, such that an optical axis of rays emitted by the ray source is projected obliquely onto a surface of the battery under inspection; and acquiring an initial image obtained by the detector by receiving rays penetrating the battery under inspection, wherein the initial image is used for defect inspection of the battery under inspection; wherein:

the battery under inspection comprises an end surface, wherein the end surface is a plane on which a battery end cover is located;

an optical axis of rays emitted by the ray source is projected obliquely onto the surface of the battery under inspection to at least form an included angle between the end surface and a plane on which the detector is located, wherein the included angle is configured to satisfy that:

a projection of a cathode tab of the battery under inspection, formed on a plane on which an anode tab is located based on rays projected onto the cathode tab, is offset from a region in which the anode tab is located, or an overlapping area between the two is less than a preset value.

11. The method according to claim 10, wherein:

the surface of the battery under inspection comprises a side surface, and the preset rotation axis is perpendicular to the side surface of the battery under inspection.

12. The method according to claim 10, wherein:

an optical axis of rays emitted by the ray source is projected obliquely onto a middle region of the end surface.

13. The method according to claim 10, further comprising:

adjusting a distance between the ray source and the detector and/or a distance between the supporting component and the ray source in a direction perpendicular to a plane on which the detector is located.

14. The method according to claim 10, further comprising:

in response to an inspection result of the battery under inspection being unqualified, rejecting or re-inspecting the battery under inspection.

15. An electronic device comprising:

at least one processor; and a memory communicatively connected to the at least one processor;

wherein the memory stores instructions executable by the at least one processor, and the instructions are executed by the at least one processor to enable the at least one processor to perform the battery defect inspection method according to claim 10.

16. A non-transitory computer-readable storage medium storing a computer program, wherein the computer program, when executed by a processor, implements the battery defect inspection method according to claim 10.

17. The method according to claim 10, wherein a cathode tab side of the battery under inspection is positioned closer to the ray source than a anode tab side of the battery under inspection.

18. The device according to claim 1, wherein a cathode tab side of the battery under inspection is positioned closer to the ray source than a anode tab side of the battery under inspection.

19. A battery defect inspection apparatus comprising:

a computer programmed to operate as an adjustment module configured to, in response to a battery under inspection being placed on a supporting component, the battery having an anode tab and a cathode tab, adjust an included angle between a supporting surface of the supporting component and a plane on which a detector is located, such that an optical axis of rays emitted by a ray source is projected obliquely onto a surface of the battery under inspection; wherein the included angle is configured to satisfy that a projection of the cathode tab of the battery, formed on a plane on which an anode tab is located based on rays projected onto the cathode tab, is offset from a region in which the anode tab is located, or an overlapping area between the two is less than a preset value; and the computer being programmed to operate as an acquisition module configured to acquire an initial image obtained by the detector by receiving rays penetrating the battery under inspection, wherein the initial image is used for defect inspection of the battery under inspection.

20. The apparatus according to claim 19, further comprising:

the computer being programmed to operate as an inspection module configured to perform defect inspection on the battery under inspection based on the initial image.

\* \* \* \* \*